United States Patent
Nauka (10) Patent No.: US 11,207,734 B2
(45) Date of Patent: Dec. 28, 2021

(54) FUSING OF METALLIC PARTICLES

(71) Applicant: HEWLETT-PACKARD DEVELOPMENT COMPANY, L.P., Houston, TX (US)

(72) Inventor: Krzysztof Nauka, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 236 days.

(21) Appl. No.: 16/074,564

(22) PCT Filed: Oct. 31, 2016

(86) PCT No.: PCT/US2016/059695
§ 371 (c)(1),
(2) Date: Aug. 1, 2018

(87) PCT Pub. No.: WO2018/080538
PCT Pub. Date: May 3, 2018

(65) Prior Publication Data
US 2019/0039136 A1    Feb. 7, 2019

(51) Int. Cl.
*B22F 10/20* (2021.01)
*B33Y 10/00* (2015.01)
(Continued)

(52) U.S. Cl.
CPC ............ *B22F 10/20* (2021.01); *B23K 26/342* (2015.10); *B33Y 10/00* (2014.12); *B33Y 30/00* (2014.12);
(Continued)

(58) Field of Classification Search
CPC ............................................. B22F 2003/1057
See application file for complete search history.

(56) References Cited

U.S. PATENT DOCUMENTS

2003/0209836 A1  11/2003  Sherwood
2004/0204785 A1*  10/2004  Richardson ........... B29C 64/153
                                                    700/118
(Continued)

FOREIGN PATENT DOCUMENTS

CN       1899732 A      1/2007
CN       100377830      4/2008
(Continued)

OTHER PUBLICATIONS

Park et al., "Two-step Flash Light Sintering Process For Crack-free Inkjet-printed Ag Films", IOP Science, Retrieved from Internet: http://iopscience.iop.org/article/10.1088/0960-1317/23/1/015013/pdf, Dec. 13, 2012, 3 Pages.

*Primary Examiner* — Timothy Kennedy
(74) *Attorney, Agent, or Firm* — Mannava & Kang (57) ABSTRACT

According to an example, an apparatus may include a processor and a memory on which is stored instructions. The instructions may cause the processor to control at least one energy source to apply energy at a certain low energy level onto a layer of metallic particles, in which the metallic particles have micron-level dimensions, and in which application of the certain low energy level may sinter the metallic particles and may cause formation of physical connections between adjacent ones of the metallic particles. The instructions may also cause the processor to control the at least one energy source to apply energy at a certain high energy level onto the layer of metallic particles, in which application of the certain high energy level energy may melt and fuse the sintered metallic particles.

15 Claims, 3 Drawing Sheets

(51) Int. Cl.
- *B33Y 30/00* (2015.01)
- *C22C 33/04* (2006.01)
- *B33Y 50/02* (2015.01)
- *B23K 26/342* (2014.01)
- *B29C 64/165* (2017.01)
- *B22F 10/30* (2021.01)

(52) U.S. Cl.
CPC .............. *B33Y 50/02* (2014.12); *C22C 33/04* (2013.01); *B22F 10/30* (2021.01); *B22F 2999/00* (2013.01); *B29C 64/165* (2017.08)

(56) References Cited

U.S. PATENT DOCUMENTS

| | | | |
|---|---|---|---|
| 2006/0269897 A1 | 11/2006 | Gill et al. | |
| 2008/0014457 A1* | 1/2008 | Gennaro | B23P 15/002 428/546 |
| 2010/0007062 A1* | 1/2010 | Larsson | B29C 64/153 264/485 |
| 2013/0043221 A1 | 2/2013 | Hathaway et al. | |
| 2013/0309420 A1 | 11/2013 | Flesch et al. | |
| 2014/0271328 A1 | 9/2014 | Burris | |
| 2014/0363327 A1* | 12/2014 | Holcomb | H05B 6/06 419/53 |
| 2017/0059529 A1* | 3/2017 | Kamel | B22F 3/24 |

FOREIGN PATENT DOCUMENTS

| | | |
|---|---|---|
| CN | 101443483 | 5/2009 |
| CN | 101443788 | 5/2009 |
| CN | 101479064 | 7/2009 |
| CN | 103338881 | 10/2013 |
| CN | 103857482 | 6/2014 |
| CN | 203764976 U | 8/2014 |
| CN | 105939836 | 9/2016 |
| EP | 2317831 A1 | 5/2011 |
| JP | 2000328112 A | 11/2000 |
| JP | 2012201940 A | 10/2012 |
| KR | 20150022304 A | 3/2015 |
| TW | 200936365 A | 9/2009 |
| TW | 201627136 A | 8/2016 |
| WO | 1997004884 A1 | 2/1997 |
| WO | WO-9704884 | 2/1997 |
| WO | 2004020139 A1 | 3/2004 |
| WO | 2008013483 A1 | 1/2008 |
| WO | WO-2015106844 A1 | 7/2015 |

\* cited by examiner

FUSING OF METALLIC PARTICLES

BACKGROUND

In three-dimensional (3D) printing, an additive printing process is often used to make three-dimensional solid parts from a digital model. 3D printing is often used in rapid product prototyping, mold generation, mold master generation, and short-run manufacturing. Some 3D printing techniques are considered additive processes because they involve the application of successive layers of material to an existing surface (template or previous layer). This is unlike traditional machining processes, which often rely upon the removal of material to create the final part. 3D printing often requires curing or fusing of the building material, which for some materials may be accomplished using heat-assisted extrusion, melting, or sintering, and for other materials may be performed through curing of polymer-based build materials.

BRIEF DESCRIPTION OF THE DRAWINGS

Features of the present disclosure are illustrated by way of example and not limited in the following figure(s), in which like numerals indicate like elements, in which.

DETAILED DESCRIPTION

Photonic fusing of metallic particles is based on an idea of uniformly irradiating a large area of metallic particles with a short light pulse that is sufficiently powerful to liquefy selected regions of a top layer of the metallic particles. That is, the pulse of light is of sufficiently short duration to prevent substantial energy transfer to underlying metallic particles or surrounding ambient areas so that a majority of the energy is used to heat and liquefy the top layer of metallic particles. After the pulse is terminated, the liquefied metallic particles may solidify, providing a high quality metal layer. This process may be followed by spreading another layer of the metallic particles and repeating the application of the short light pulse.

Due to the relatively high surface energies of liquefied metal, this process may result in some of the metallic particles instantaneously "balling" when liquefied and subsequently solidifying in the "balled" form. That is, while liquefied, the smaller metallic particles may combine into larger particles or spheres because of their relatively high surface energies. As a result, a metal film formed from the liquefied metallic particles may have a discontinuous surface and balls of metallic particles may be formed on the surface of the metal film. By way of example, AlSi12 (Al) may have a surface tension of 1180 mN/m at the melting temperature (Tm) of Al, Cu may have a surface tension of 1420 mN/m at the Tm of Cu, Hastelloy (Ni) may have a surface tension of 1890 mN/m at the Tm of Ni, and stainless steel (SS316) may have a surface tension of 1930 mN/m at the Tm of stainless steel. In contrast, Nylon 12 and other polymers may have a surface tension from the range between 5 mN/m and 20 mN/m at their respective melting temperatures and thus may not form into spheres or balls when liquefied.

Disclosed herein are apparatuses and methods that may be employed to implement a fabrication process that may result in improved fused metal properties compared to other fabrication processes. Particularly, the apparatuses and methods disclosed herein implement a multi-step fabrication process that incorporates application of energy onto metallic particles at multiple energy levels. For instance, energy at a certain low energy level may be applied to the metallic particles, in which the certain low energy level sinters the metallic particles and causes formation of physical connections between adjacent ones of the metallic particles. In other words, the certain low energy level may be an energy level that is sufficient to cause the metallic particles to sinter without being melted. The surface energy of the assembly of the metallic particles with the physical connections between them may be relatively lower than the surface energies of the metallic particles prior to the sintering. For instance, the surface energy of the assembly per unit area may be lower than the surface energies per unit area of the metallic particles prior to the sintering.

Following application of energy at the certain low energy level, energy at a certain high energy level may be applied onto the layer of metallic particles. The certain high energy level may be an energy level that is sufficient to cause the sintered metallic particles to melt and subsequently fuse together. In one regard, because the surface energies of the metallic particles have been reduced prior to melting of the metallic particles, the metallic particles are less likely to undergo "balling" (e.g., form into larger spheres) while in a liquefied state and prior to solidification. Accordingly, through implementation of the multistep fabrication process disclosed herein, metallic particles may be fused together into a continuous or almost continuous metal film through implementation of photonic fusing. The multi-step fabrication process may include application of energy at additional energy levels and/or multiple times at the same energy level. The number of times, durations, and energy levels at which the energy is applied may vary for different types of metals, particles sizes, and/or distributions of metallic particles. Accordingly, in various examples, the multi-step fabrication process may be tuned to the characteristics of different metallic particles.

Before continuing, it is noted that as used herein, the terms "includes" and "including" mean, but is not limited to, "includes" or "including" and "includes at least" or "including at least." The term "based on" means "based on" and "based at least in part on."

Figure 1:
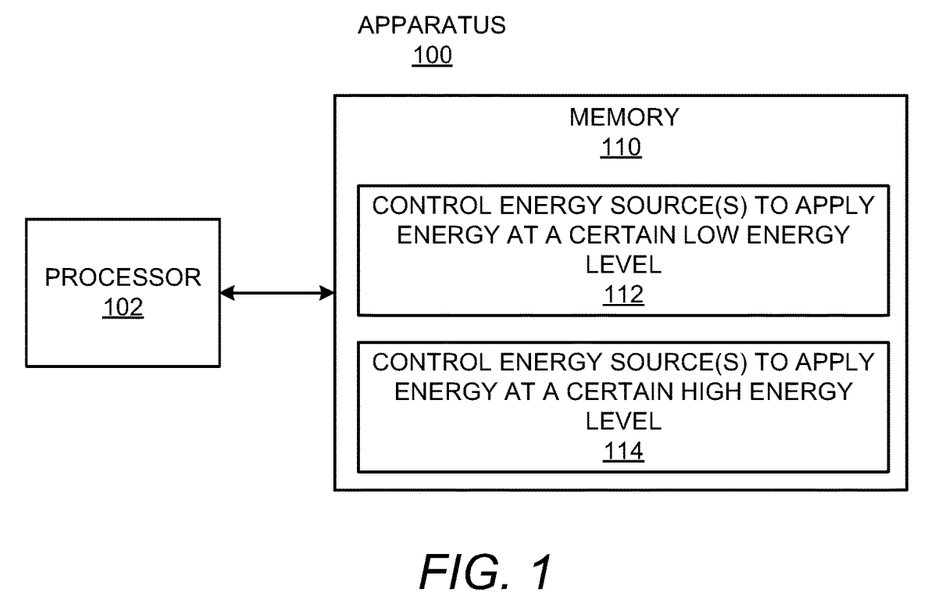
FIG. 1 shows a block diagram of an example apparatus.

With reference first to FIG. 1, there is shown a block diagram of an example apparatus 100. The apparatus 100 may be a computing apparatus, e.g., a personal computer, a laptop computer, a tablet computer, a smartphone, or the like. In these examples, the apparatus 100 may be separate from a 3D fabricating device and may communicate instructions to the 3D fabricating device over a direct or a network connection. In other examples, the apparatus 100 may be part of a 3D fabricating device. In these examples, the apparatus 100 may be part of a control system of the 3D fabricating device and may communicate instructions to fabrication components of the 3D fabricating device, for instance, over a bus. By way of example, the processor 102 may communicate instructions to or otherwise control the fabrication components, which may be components of the 3D fabricating device, to fabricate a 3D object from layers of metallic particles.

The processor 102 may be a semiconductor-based microprocessor, a central processing unit (CPU), an application specific integrated circuit (ASIC), and/or other hardware device. The apparatus 100 may also include a memory 110 that may have stored thereon machine readable instructions 112 and 114 (which may also be termed computer readable instructions) that the processor 102 may execute. The memory 110 may be any electronic, magnetic, optical, or other physical storage device that contains or stores executable instructions. Thus, the memory 110 may be, for example, Random Access Memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to control at least one energy source to apply energy at a certain low energy level onto a layer of metallic particles. According to an example, the metallic particles, which are also referenced herein as metallic microparticles, may be particles that may be used to form three-dimensional (3D) parts in an additive manufacturing process. The metallic particles may thus be formed of any suitable metallic materials that may be employed in additive manufacturing processes, such as silver, copper, aluminum, nickel, stainless steel, titanium, combinations thereof, and the like.

The metallic particles may also have dimensions in the micron-sized level. For instance, the metallic particles may have dimensions, e.g., widths, diameters, or the like, that are generally between about 5 μm and about 100 μm. In other examples, the metallic particles may have dimensions that are generally between about 30 μm and about 60 μm. The metallic particles may generally have spherical shapes, for instance, as a result of surface energies of the metallic particles and/or processes employed to fabricate the metallic particles. The term "generally" may be defined as including that a majority of the metallic particles have the specified sizes and spherical shapes. In other examples, the term "generally" may be defined as a large percentage, e.g., around 80% or more of the metallic particles have the specified sizes and spherical shapes.

Figure 2:
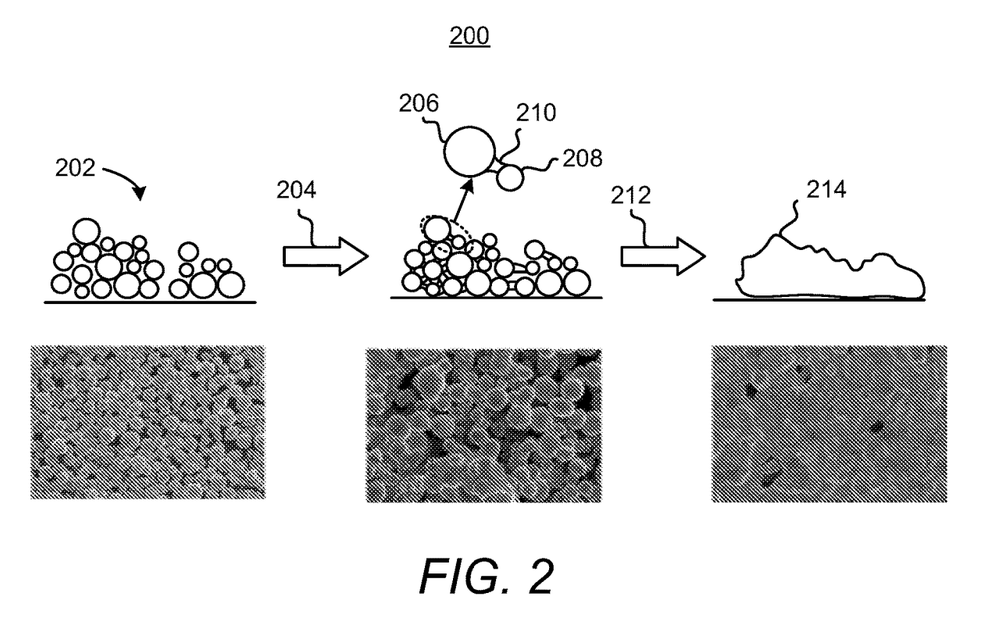
FIG. 2 shows a simplified diagram of a plurality of metallic particles during various stages at which energy at multiple energy levels are applied on the metallic particles by the example apparatus depicted in FIG. 1.

With reference to FIG. 2, there is shown a simplified diagram 200 of a plurality of metallic particles 202 during various stages at which energy at multiple energy levels are applied on the metallic particles 202 by the example apparatus depicted in FIG. 1. The metallic particles 202 are initially depicted as having the generally spherical shapes as discussed above. The application of energy at the certain low energy level is denoted by the arrow 204. As shown, application of the energy at the certain low energy level may result in the metallic particles 202 becoming sintered. Additionally, sintering of the metallic particles 202 may cause the formation of physical connections or bridges between adjacent ones of the metallic particles 202. An enlarged portion of FIG. 2 shows a pair of metallic particles 206, 208 in which a physical connection 210 has been formed as a result of the receipt of energy at the certain low energy level. Generally speaking, by sintering the metallic particles 202 and forming the physical connections 210 between the metallic particles 202, the surface energies of the metallic particles 202 may substantially be reduced.

According to an example, the certain low energy level may be an energy level at which energy such as light, heat, radiation, combinations thereof, or the like, may be applied to the metallic particles 202 to cause the metallic particles 202 to begin to sinter or to sinter to a point at which physical connections 210 are formed between some or all of the metallic particles 202. As different types of metals and different sizes of metallic particles may require different levels of energy to reach this level of sintering, the certain low energy level may differ for different types of metals, different particles sizes, and/or different distributions of metallic particles. By way of example, the certain low energy levels for different types of metals, different particle sizes, and/or different distributions of metallic particles may be determined through testing, through modeling, or the like. Additionally, the determined certain low energy levels may be stored in a data store and the processor 102 may tune the certain low energy level to be applied onto metallic particles 202 from the determined certain low energy levels stored in the data store. That is, the processor 102 may identify the certain low energy level to be used in the execution of the instructions 112 based upon inputted information pertaining to the metallic particles 202, such as the type of metal and/or the particle sizes.

Also shown in FIG. 2 are a plurality of magnified images obtained for metallic particles 202 at various stages of formation, which depict how the metallic particles 202 may be change following application of energy at the multiple energy levels discussed herein. Particularly, FIG. 2 depicts experimental results for stainless steel metallic particles having a maximum of 45 μm particle sizes. The certain low energy level as denoted by the arrow 204 was 24.168 J/cm$^2$ and in the certain high energy level is noted by the arrow 212 was 46.163 J/cm$^2$. The thickness of the layer of metallic particles 202 was 200 μm.

With reference to FIGS. 1 and 2, the processor 102 may also fetch, decode, and execute the instructions 114 to control at least one energy source to apply energy at a certain high energy level onto a layer of metallic particles 202. According to an example, the certain high energy level may be an energy level at which energy such as light, heat, radiation, combinations thereof, or the like, may be applied to the metallic particles 202 to cause the sintered metallic particles 202 to melt. In this regard, the certain high energy level may be higher than the certain low energy level. The application of energy at the certain high energy level is denoted by the arrow 212 in FIG. 2.

As shown, application of the energy at the certain high energy level may result in the sintered metallic particles 202 becoming melted into a continuous or almost continuous metal film 214. The metal film 214 may be considered as being almost continuous when the metal film 214 has a porosity that is below 5%. Generally speaking, a more continuous metal film may be formed through application of energy at the certain low energy level prior to application of energy at the certain high energy level as disclosed herein than through application of energy at the certain high energy level alone. This may occur because the lower surface energies of sintered or partially sintered metallic particles 202 may reduce the propensity of the metallic particles to form into larger spheres and instead, to form into a more continuous layer or film. As a result, a surface of the layer of melted metallic particles 214 may be relatively smoother than metallic particles that are melted through application of the certain high energy level alone. Additionally, formation of larger spheres of metallic particles on the surface of the layer of melted metallic particles 214 may also be reduced or eliminated.

As different types of metals and different sizes of metallic particles may require different levels of energy to be melted, the certain high energy level may differ for different types of metals, different particle sizes, and/or different distributions of metallic particles. By way of example, the certain high energy levels for different types of metals, different particle sizes, and/or different distributions of metallic particles may be determined through testing, through modeling, or the like. Additionally, the determined certain high energy levels may be stored in a data store and the processor 102 may identify the certain high energy level to be applied onto metallic particles 202 from the determined certain high energy levels stored in the data store. That is, the processor 102 may identify the certain high energy level to be used during execution of the instructions 114 based upon inputted information pertaining to the metallic particles 202, such as the type of metal, the particle sizes, and/or the distribution of the metallic particles.

Figure 3:
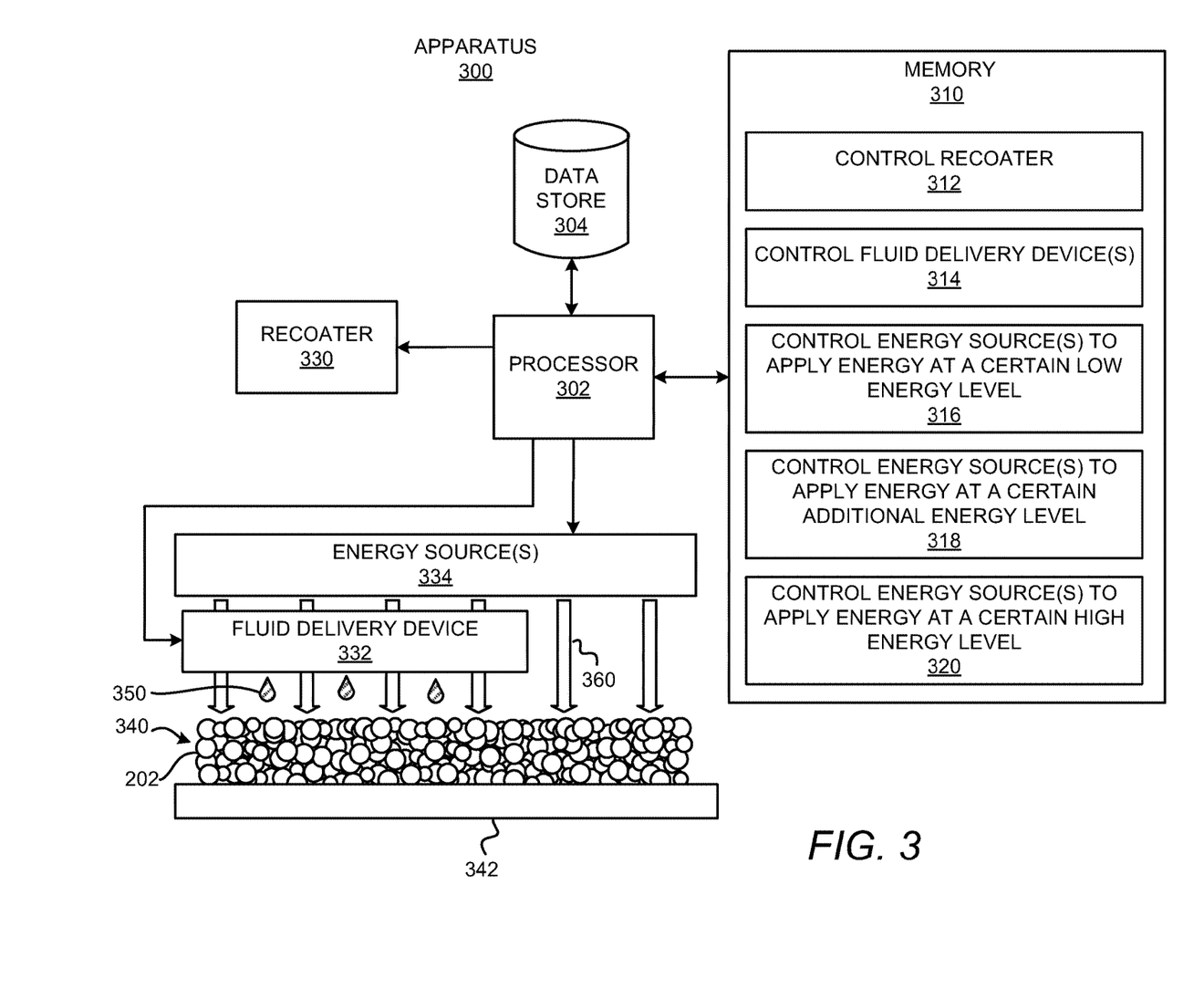
FIG. 3 shows a block diagram of another example apparatus.

Turning now to FIG. 3, there is shown a block diagram of another example apparatus 300, which may also be a computing apparatus or a 3D fabricating device. The apparatus 300 may include a processor 302, a data store 304, and a memory 310. The processor 302 may control operations of the apparatus 300 and may be similar to the processor 102 discussed above with respect to FIG. 1. The memory 310 may have stored thereon machine readable instructions 312-320 (which may also be termed computer readable instructions) that the processor 302 may execute. The memory 310 may be similar to the memory 110 discussed above with respect to FIG. 1. The data store 304 may also be a data storage device that may store data in a volatile or a nonvolatile manner. The description of the apparatus 300 is also made with respect to the features shown in the diagram 200 in FIG. 2.

The processor 302 may fetch, decode, and execute the instructions 312 to control a recoater 330 to spread a plurality of metallic particles 202 to form a layer of metallic particles 340 over a surface 342. The surface 342 may be a build platform or a previously formed layer 340 of metallic particles 202. In instances in which the surface 342 is a build platform, the surface 342 may be heated. As discussed above, the metallic particles 202 may also be referenced as metallic micro-particles and may have micron-level dimensions. The recoater 330 may have a cylindrical configuration and may be rotated and translated over the metallic particles 202 to position the metallic particles 202 into the layer 340. By way of example, the recoater 330 may be formed of a metallic material and may have a polished or a textured surface. The recoater 330 may be employed to form the layer 340 to have a substantially uniform thickness across the surface 342. In other examples, the recoater 330 may be a doctor blade or other suitable device for spreading the metallic particles 202 into a layer. In an example, the thickness of the layer 340 may range from about 90 μm to about 110 μm, although thinner or thicker layers may also be used. For example, the thickness of the layer 340 may range from about 20 μm to about 200 μm, or from about 50 μm to about 200 μm. As another example, the thickness of the layer 340 may range from about 20 μm to about 60 μm.

The processor 302 may fetch, decode, and execute the instructions 314 to control a fluid delivery device 332 to deliver an agent 350 onto selected areas of the layer 340 of metallic particles 202. The agent 350 may enhance energy absorption or may reduce energy absorption of the metallic particles 202 on which the agent 350 is delivered. In instances in which the agent 350 may enhance energy absorption of the metallic particles 202, the processor 302 may control the fluid delivery device 332 to deliver the agent 350 onto areas of the layer of metallic particles 202 that are to be fused together. In contrast, in instances in which the agent 350 may reduce energy absorption of the metallic particles 202, the processor 302 may control the fluid delivery device 332 to deliver the agent 350 onto areas of the layer 340 of metallic particles 202 that are not to be fused together. In any regard, the processor 302 may control the fluid delivery device 332 to deliver the agent 350 onto selected areas of the layer 340 of metallic particles 202 to fuse a subset of the metallic particles 202 into a predefined shape.

The fluid delivery device 332 may be scanned across the layer 340 in one or two directions to enable droplets of the agent 350 to be delivered to selected areas of the layer 340 of metallic particles 202. In addition or in other examples, the fluid delivery device 332 may remain stationary and the layer 340 of metallic particles 202 may move with respect to the fluid delivery device 332. In still other examples, both the fluid delivery device 332 and the layer 340 of metallic particles 202 may move with respect to each other. According to examples, the fluid delivery device 332 may be a thermal inkjet printhead, a piezoelectric printhead, or the like. Additionally, multiple fluid delivery devices may be employed to deliver the same or multiple types of agents.

The processor 302 may fetch, decode, and execute the instructions 316 to control at least one energy source 334 to apply energy 360 at a certain low energy level onto the layer of metallic particles 202 following application of droplets of the agent 350 onto the layer 340 of the metallic particles 202. Execution of the instructions 316 may be equivalent to execution of the instructions 112 discussed above with respect to FIGS. 1 and 2 and thus a detailed description of the instructions 316 is not repeated herein.

The processor 302 may fetch, decode, and execute the instructions 318 to control the at least one energy source 334 to apply energy 360 at a certain additional energy level onto the layer 340 of metallic particles 202. Application of energy 360 at the certain additional energy level may occur following application of energy at the certain low energy level and may further melt the sintered metallic particles 206, 208 and may thus further reduce the surface energies of the metallic particles 206, 208. Accordingly, application of energy at the certain additional energy level may further enhance formation of a continuous or almost continuous metal film from the metallic particles 202 during melting of the metallic particles 202.

As different types of metals and different sizes of metallic particles may require different levels of energy to enhance formation of the continuous or almost continuous metal layer from the metallic particles 202, the certain additional energy level may differ for different types of metals, different particle sizes, and/or distributions of metallic particles. By way of example, the certain additional energy levels for different types of metals, different particle sizes, and/or different distributions of metallic particles, may be determined through testing, through modeling, or the like. Additionally, the determined certain high energy levels may be stored in the data store 304 and the processor 302 may identify the certain additional energy level to be applied onto metallic particles 202 from the determined certain additional energy levels stored in the data store 304. That is, the processor 102 may identify the certain additional energy level to be used during execution of the instructions 318 based upon inputted information pertaining to the metallic particles 202, such as the type of metal and/or the particle sizes. The processor 302 may additionally execute the instructions 318 to apply energy at multiple certain additional energy levels, for instance, in instances in which application of energy at the multiple certain additional energy levels results in the formation of a more continuous or almost continuous metal layer from the metallic particles 202.

The processor 302 may fetch, decode, and execute the instructions 320 to control the at least one energy source 334 to apply energy 360 at a certain high energy level onto the layer of metallic particles 202. Execution of the instructions 320 may be equivalent to execution of the instructions 114 discussed above with respect to FIGS. 1 and 2 and thus a detailed description of the instructions 320 is not repeated herein.

According to examples, the at least one energy source 334 may be at least one energy source, such as a strobe lamp, that is able to flash heat a relatively large area of the layer 340 during a single flash. For instance, the at least one energy source 334 may be a Xe strobe lamp that is to apply short light pulses onto the layer 340 of metallic particles 202. Thus, for instance, in contrast to other metal printing techniques such as solid laser melting or electron beam melting, the use of the at least one energy source 334 disclosed herein may enable the simultaneous melting and solidification of large regions of metallic particles 202. In some examples, the at least one energy source 334 may be fixed with respect to the layer 340 of metallic particles 202. In other examples, the at least one energy source 334 may be movable with respect to the layer 340 of metallic particles 202.

In any regard, the processor 302 may control the at least one energy source 334 to apply short bursts of energy 360 at the various energy levels. For instance, the processor 302 may control the at least one energy source 334 to flash a single time at the certain low energy level for about 15 ms. Similarly, the processor 302 may control the at least one energy source 334 to flash a single time at the certain additional energy level for about 15 ms. Likewise, the processor 302 may control the at least one energy source 334 to flash a single time at the certain high energy level for about 15 ms. In other examples, the processor 302 may vary the number of times and/or the durations at which the at least one energy source 334 is flashed at the various energy levels. For instance, the durations may vary for types of metals, particle sizes, and/or distribution of metallic particles 202.

According to examples, the at least one energy source 334 may be a single energy source that may be operated at multiple energy levels, e.g., the certain low energy level, the certain additional energy level, the certain high energy level, etc. In other examples, the at least one energy source 334 may be a plurality of energy sources. In these examples, the processor 302 may control a first energy source to apply energy at the certain low energy level, may control a second energy source to apply energy at the certain additional energy level, may control a third energy source to apply energy at the certain high energy level, etc. In any of these examples, the at least one energy source 334 maybe a photonic fusing source, such as, a Xenon (Xe) strobe lamp, although other types of strobe lamps may be implemented.

In examples in which the apparatus 300 is a 3D printer, the apparatus 300 may include the recoater 330, the fluid delivery device 332, and the at least one energy source 334. In examples in which the apparatus 300 is not a 3D printer, the recoater 330, the fluid delivery device 332, and the at least one energy source 334 may be included in a 3D printer to which the apparatus 300 may be in communication.

Figure 4:
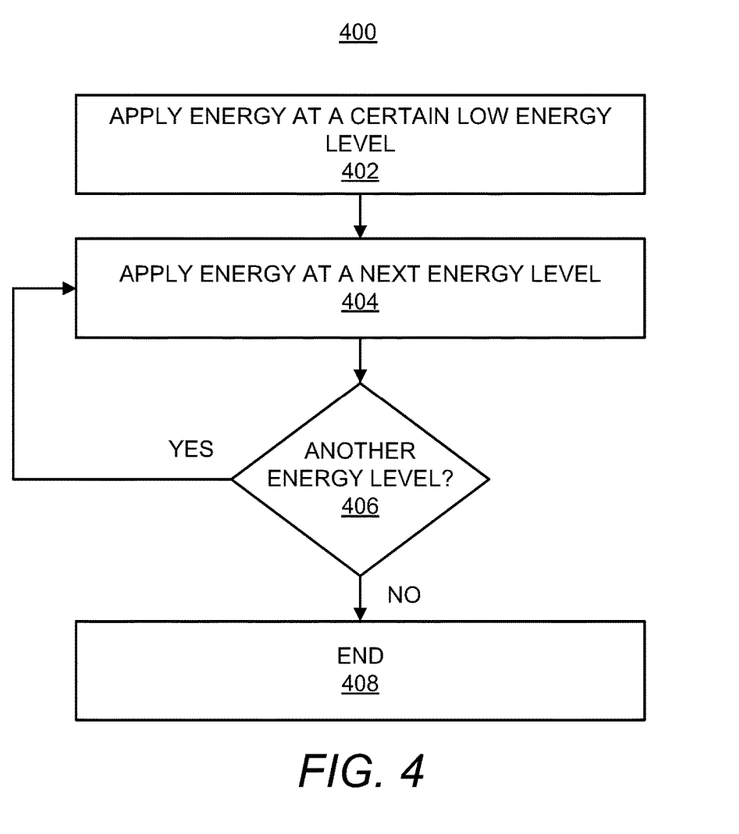
FIG. 4 shows a flow diagram of an example method for melting and fusing metallic particles.

Various manners in which the apparatus 300 (or apparatus 100) may be implemented are discussed in greater detail with respect to the method 400 depicted in FIG. 4. Particularly, FIG. 4 depicts an example method 400 for melting and fusing metallic particles. It should be apparent to those of ordinary skill in the art that the method 400 may represent a generalized illustration and that other operations may be added or existing operations may be removed, modified, or rearranged without departing from a scope of the method 400.

The description of the method 400 is made with reference to the apparatuses 100, 300 illustrated in FIGS. 1 and 3 and the diagram 200 depicted in FIG. 2 for purposes of illustration. It should be understood that apparatuses, e.g., computers, 3D printers, or the like, having other configurations may be implemented to perform the method 400 without departing from a scope of the method 400.

At block 402, the processor 102, 302 may execute the instructions 112, 316 to apply energy 360 at a certain low energy level onto a layer 340 of metallic particles 202. As discussed above, application of the certain low energy level may cause the metallic particles 202 to sinter and form physical connections between adjacent ones of the metallic particles 202 to be formed.

At block 404, the processor 102, 302 may execute the instructions 114, 318/320 to apply energy 360 at a next energy level onto the layer 340 of metallic particles 202. The next energy level may be a certain additional energy level or the certain high energy level as discussed in detail herein.

At block 406, the processor 102, 302 may determine whether energy is to be applied at another level. The processor 102, 302 may make this determination based upon the type of metal, the particle sizes, and/or distribution of the metallic particles 202 and a number of times and the energy levels that result, for instance, in a layer or film having at least a predefined level of continuity (e.g., porosity). For instance, the processor 102, 302 may determine that a single low energy level pulse is to be applied prior to application of the certain high level energy pulse. In this case, the processor 102, 302 may have caused energy at the certain high level energy level to be applied at block 404 and the processor 102, 302 may determine at block 406 that energy at another energy level is not to be applied. Additionally, the method 400 may end as indicated at block 408.

In another example, the processor 102, 302 may determine that energy level pulses at multiple energy levels below an energy level that results in melting of the metallic particles 202 are to be applied prior to application of the certain high energy level. For instance, the processor 102, 302 may be instructed to apply energy at the multiple energy levels in order to cause the metallic particles 202 to form into the continuous or almost continuous film. In this example, the processor 102, 302 may determine, at block 406, that energy at the another energy level is to be applied and the processor 102, 302 may cause energy to applied at a next energy level at block 404. The next energy level may be a certain additional energy level or the certain high energy level. Additionally, blocks 404-406 may be repeated until the processor 102, 302 has caused energy at the certain high energy level to be applied to the metallic particles 202.

Although not shown in FIG. 4, the processor 102, 302 may also control a recoater 330 to form the layer of metallic particles 202 and a fluid delivery device 332 to deliver an agent 350 to selected areas of the layer of metallic particles 202 prior to performance of blocks 402-408. In addition, the processor 102, 302 may control the recoater 330 to form another layer of metallic particles 202 and the fluid delivery device 332 to deliver the agent 350 to selected areas of the another layer of metallic particles 202 following performance of blocks 402-408.

Some or all of the operations set forth in the method 400 may be contained as utilities, programs, or subprograms, in any desired computer accessible medium. In addition, the method 400 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5A:
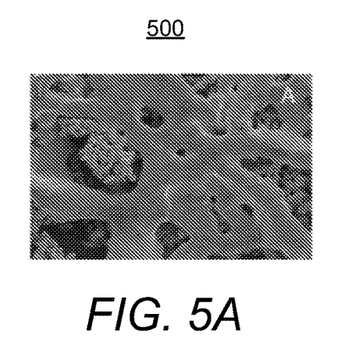
FIGS. 5A-5C, respectively, show images obtained for metallic particles upon which energy at different levels of a certain low energy level and a certain high energy level were applied through implementation of example features disclosed herein.
Figure 5B:
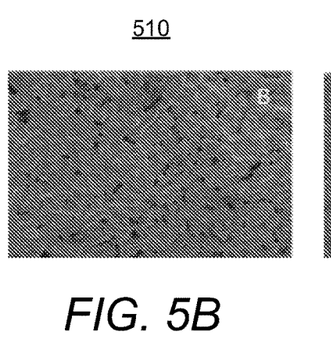
Figure 5C:
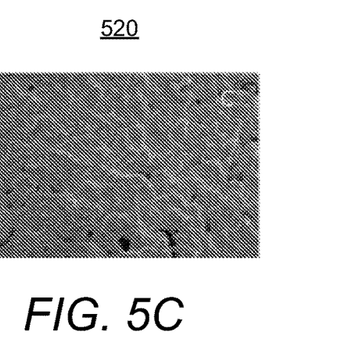

With reference now to FIGS. 5A-5C, there are respectively shown magnified images 500-520 obtained for metallic particles 202 upon which energy at different levels of a certain low energy level and a certain high energy level were applied through implementation of example features disclosed herein. As may be seen in the images 500-520, application of different energy levels may result in different levels of smoothness in the melted and fused metallic particles 202. In one regard, therefore, and as discussed herein, the certain low energy level, the certain high energy level, and the certain additional energy level may be tuned for different types of metals, particles sizes, and/or distribution of metallic particles.

In the images 500-520, the metal particles are stainless steel metal particles having dimensions that are at maximum 45 μm. In the image 500 shown in FIG. 5A, a single low energy flash delivering 32.717 J/cm$^2$ was applied followed a few seconds later by a single 15 ms high energy flash delivering 46.163 J/cm$^2$ of energy. In the image 510 shown in FIG. 5B, a first flash at a low energy level of 21.618 J/cm$^2$ and a second flash at another energy level of 28.521 J/cm$^2$ were applied followed a few seconds later by a single 15 ms high energy flash delivering 46.163 J/cm$^2$ of energy. In the image 520, two flashes at a low energy level of 21.618 J/cm$^2$ and two flashes at another energy level of 27.815 J/cm$^2$ were applied followed a few seconds later by a single 15 ms high energy flash delivering 46.163 J/cm$^2$ of energy. In comparing the images 500-520 it may be evident that the process used to form the metal film shown in FIG. 5C resulted in a metal film having the highest level of continuity and thus, that process may be a preferred process in the melting and fusing of the metallic particles having a particular set of characteristics.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   at least one strobe lamp;
   a processor; and
   a non-transitory memory on which is stored instructions that are executable to cause the processor to:
   control the at least one strobe lamp to apply a pulse of energy at a low energy level onto a first layer of metallic particles to sinter the metallic particles in the first layer without melting the metallic particles, wherein the low energy level to sinter the metallic particles is determined based on inputted information of a type and a size of the metallic particles, and wherein sintering the metallic particles causes physical connections between adjacent ones of the metallic particles without melting the metallic particles; and
   following the application of the pulse of energy at the low energy level, control the at least one strobe lamp to apply a pulse of energy at a high energy level onto the first layer of metallic particles to melt and fuse the sintered metallic particles.

2. The apparatus according to claim 1, wherein the instructions are executable to cause the processor to control the at least one strobe lamp to apply the pulse of energy at the low energy level for a first specified period of time and to control the at least one strobe lamp to apply the pulse of energy at the high energy level tbr a second specified period of time following the application of the pulse of energy at the low energy level.

3. The apparatus according to claim 1, wherein the instructions are executable to cause the processor to control the at least one strobe lamp to apply the pulse of energy at an additional energy level for a specified period of time between control of the at least one strobe lamp to apply the pulse of energy at the low energy level and control of the at least one strobe lamp to apply the pulse of energy at the high energy level, wherein the application of the additional energy level is to further melt the sintered metallic particles, and the application of the pulse of energy at the low energy level and at the additional energy level are to reduce surface energies of the metallic particles, and wherein the application of the pulse of energy at the high energy level is to cause formation of a continuous metal film.

4. The apparatus according to claim 1, wherein the metallic particles comprise a particular type of metal and wherein the low energy level and the high energy level comprise levels that are tuned to the particular type of metal to respectively cause a predefined level of sintering and melting of the metallic particles to occur.

5. The apparatus according to claim 1, further comprising:
   a recoater to spread the metallic particles into the first layer of metallic particles; and
   a fluid delivery device to deliver an agent onto selected areas of the first layer of metallic particles, wherein the agent is to enhance energy absorption of the metallic particles on which the agent is delivered.

6. The apparatus according to claim 1, wherein the at least one strobe lamp comprises a first strobe lamp and a second strobe lamp, and wherein the processor is to control the first strobe lamp to apply the pulse of energy at the low energy level and to control the second strobe lamp to apply the pulse of energy at the high energy level.

7. The apparatus according to claim 1, wherein the metallic particles generally have spherical shapes having diameters that range between about 5 µm and about 100 µm.

8. A method comprising:
controlling, by a processor, at least one strobe lamp to apply a pulse of energy at a low energy level onto a first layer of metallic particles to sinter the metallic particles in the first layer without melting the metallic particles, wherein the low energy level to sinter the metallic particles is determined based on inputted information of a type and a size of the metallic particles, and wherein sintering the metallic particles, causes physical connections between adjacent ones of the metallic particles without melting the metallic particles; and
following the application of the pulse of energy at the low energy level, controlling, b the processor, the at least one strobe lamp to apply a pulse of energy at a high energy level onto the first layer of metallic particles to melt and fuse the sintered metallic particles.

9. The method according to claim 8, wherein controlling the at least one strobe lamp to apply the pulse of energy at the low energy level further comprises controlling the at least one strobe lamp to apply the pulse of energy at the low energy level for a first specified period of time and wherein controlling the at least one strobe lamp to apply the pulse of energy at the high-energy level further comprises controlling the at least one strobe lamp to apply the pulse of energy at the high-energy level for a second specified period of time.

10. The method according to claim 8, wherein the metallic particles comprise a particular type of metal and wherein the low energy level and the high energy level comprise levels that are tuned to the particular type of metal to respectively cause a predefined level of sintering and melting of the metallic particles.

11. The method according to claim 8, wherein controlling the at least one strobe lamp to apply the pulse of energy at the low energy level comprises controlling a first strobe lamp to apply the pulse of energy at the low energy level and wherein controlling the at least one strobe lamp to apply the pulse of energy at the high energy level comprises controlling a second strobe lamp to apply the pulse of energy at the high energy level.

12. A printing apparatus comprising:
a recoater to form a layer of metallic micro-particles;
a fluid delivery device to deliver an agent, wherein the agent is to enhance energy absorption or reduce energy absorption of the metallic micro-particles on which the agent is delivered;
at least one strobe lamp; and
a processor to:
control the fluid delivery device to deliver the agent onto selected areas of the layer of metallic micro-particles;
control the at least one strobe lamp to apply a pulse of energy at a low energy level onto the layer of metallic micro-particles to sinter the metallic micro-particles in the layer without melting the metallic micro-particles, wherein the low energy level to sinter the metallic micro-particles is determined based on inputted information of a type and a size of the metallic particles, and wherein sintering the metallic micro-particles causes physical connections between adjacent ones of the metallic micro-particles to be formed without melting the metallic micro-particles; and
after the at least one strobe lamp is controlled to apply the pulse of energy at the low energy level, control the at least One strobe lamp to apply a pulse of energy at a high energy level onto the layer of metallic micro-particles to melt and fuse the sintered metallic micro-particles.

13. The apparatus according to claim 12, wherein the processor is further to control the at least one strobe lamp to apply a pulse of energy at an additional energy level for a specified period of time between control of the at least one strobe lamp to apply the pulse of energy at the low energy level and control of the at least one strobe lamp to apply the pulse of energy at the high energy level, wherein the application of the additional energy level is to further melt the sintered metallic micro-particles, and the application of the pulses of energy at the low energy level and at the additional energy level are to reduce surface energies of the metallic micro-particles, and wherein the application of the pulse of energy at the high energy level is to cause formation of a continuous metal film.

14. The apparatus according to claim 12, wherein the at least one strobe lamp comprises a Xenon strobe lamp.

15. The apparatus according to claim 12, wherein the at least one strobe lamp comprises a first strobe lamp and a second strobe tamp, and wherein the processor is to control the first strobe lamp to apply the pulse of energy at the low energy level and to control the second strobe lamp to apply the pulse of energy at the high energy level.

* * * * *